United States Patent
Hutchinson

(10) Patent No.: US 10,708,043 B2
(45) Date of Patent: Jul. 7, 2020

(54) ONE PAD COMMUNICATIONS

(71) Applicant: David Mayer Hutchinson, Bowie, MD (US)

(72) Inventor: David Mayer Hutchinson, Bowie, MD (US)

(*) Notice: Subject to any disclaimer, the term of this patent is extended or adjusted under 35 U.S.C. 154(b) by 0 days.

(21) Appl. No.: 13/788,168

(22) Filed: Mar. 7, 2013

(65) Prior Publication Data

US 2014/0056425 A1    Feb. 27, 2014

(51) Int. Cl.
- *H04L 9/00* (2006.01)
- *H04L 9/08* (2006.01)
- *H04L 9/06* (2006.01)

(52) U.S. Cl.
CPC .......... *H04L 9/0816* (2013.01); *H04L 9/0662* (2013.01)

(58) Field of Classification Search
CPC ............................ H04L 9/0816; H04L 9/0662
USPC .......................................................... 380/46
See application file for complete search history.

(56) References Cited

U.S. PATENT DOCUMENTS

| | | |
|---|---|---|
| 4,107,458 A | 8/1978 | Constant |
| 4,195,293 A | 3/1980 | Margolin |
| 4,379,206 A | 4/1983 | Aoki |
| 4,424,414 A | 1/1984 | Hellman et al. |
| 4,531,022 A | 7/1985 | Pioli |
| 4,611,333 A | 9/1986 | McCallister et al. |
| 4,668,103 A | 5/1987 | Wilson |
| 4,680,539 A | 7/1987 | Tsai |
| 4,734,921 A | 3/1988 | Giangano et al. |
| 4,801,870 A | 1/1989 | Eichelberger et al. |
| 4,809,327 A | 2/1989 | Shima |
| 4,870,680 A | 9/1989 | Ohtsuka et al. |
| 4,905,176 A | 2/1990 | Schulz |
| 4,965,881 A | 10/1990 | Dilley |
| 5,073,909 A | 12/1991 | Kotzin et al. |
| 5,124,117 A | 6/1992 | Tatebayashi et al. |
| 5,150,389 A | 9/1992 | Kawasaki |
| 5,297,207 A * | 3/1994 | Degele ........................... 380/46 |
| 5,335,280 A | 8/1994 | Vobach |
| 5,363,448 A * | 11/1994 | Koopman et al. ............ 713/170 |
| 5,377,270 A | 12/1994 | Koopman, Jr. et al. |
| 5,412,729 A | 5/1995 | Liu |
| 5,434,807 A | 7/1995 | Yoshida |

(Continued)

OTHER PUBLICATIONS

Hoonjae Leea; Parallel stream cipher for secure high-speed communications; Signal Processing; Nov. 2001.*

*Primary Examiner* — Monjur Rahim
(74) *Attorney, Agent, or Firm* — Law Office of Oliver Edwards LLC; Oliver Edwards

(57) ABSTRACT

Perfect secrecy can only be assumed if the length of the key is as long the message sent and the cardinality of the key space is the same as that of the message. The preferred embodiment will demonstrate how to implement a one-pad communication system between a transmitter and a receiver where only a few parameters need to be transferred to the receiver. The preferred embodiment will also demonstrate that a true random number will be generated and used. In an M-sequence LFSR, the integers $N+K=M$ will be used. $2^N$ will be the number of random number runs and $2^K$ will be the quantity of random numbers generated during the runs. The formula is: $(2^N-1)*(2^K)+(2^K-1)$.

9 Claims, 8 Drawing Sheets

(56) References Cited

U.S. PATENT DOCUMENTS

| | | |
|---|---|---|
| 5,539,827 A | 7/1996 | Liu |
| 5,696,828 A * | 12/1997 | Koopman, Jr. .................. 380/46 |
| 5,734,826 A * | 3/1998 | Olnowich et al. ............ 709/238 |
| 5,757,923 A | 5/1998 | Koopman, Jr. |
| 5,799,090 A | 8/1998 | Angert |
| 5,862,325 A | 1/1999 | Reed et al. |
| 5,870,477 A | 2/1999 | Sasaki et al. |
| 5,966,448 A | 10/1999 | Namba et al. |
| 5,974,433 A | 10/1999 | Currie |
| 6,009,135 A | 12/1999 | Ozluturk |
| 6,148,053 A | 11/2000 | Ozluturk |
| 6,157,645 A | 12/2000 | Shobatake |
| 6,181,164 B1 | 1/2001 | Miller |
| 6,188,714 B1 * | 2/2001 | Yamaguchi .................. 375/130 |
| 6,252,958 B1 | 6/2001 | Rose |
| 6,263,082 B1 | 7/2001 | Ishimoto et al. |
| 6,282,230 B1 | 8/2001 | Brown et al. |
| 6,324,287 B1 | 11/2001 | Angert |
| 6,353,842 B1 | 3/2002 | Janusz |
| 6,363,152 B1 * | 3/2002 | Cornelius et al. ............ 380/255 |
| 6,439,246 B2 | 8/2002 | Stanley |
| 6,539,409 B2 | 3/2003 | Rajski et al. |
| 6,594,317 B2 | 7/2003 | Gorday et al. |
| 6,631,158 B2 | 10/2003 | Lipponen et al. |
| 6,708,192 B2 | 3/2004 | Rajski |
| 6,714,614 B2 | 3/2004 | Ozluturk |
| 6,735,606 B2 | 5/2004 | Terasawa et al. |
| 6,754,345 B2 | 6/2004 | Ishimoto et al. |
| 6,763,363 B1 | 7/2004 | Driscoll |
| 6,782,476 B1 | 8/2004 | Ishibashi |
| 6,922,089 B2 | 7/2005 | Shiung |
| 6,944,253 B2 | 9/2005 | Ozluturk |
| 7,047,222 B1 | 5/2006 | Bush |
| 7,120,696 B1 | 10/2006 | Au et al. |
| 7,133,525 B1 * | 11/2006 | DeGregorio et al. ........ 380/244 |
| 7,502,468 B2 * | 3/2009 | Blakley et al. ................ 380/46 |
| 8,131,789 B2 | 3/2012 | Vergnes et al. |
| 8,150,900 B2 | 4/2012 | Golic |
| 8,209,367 B2 * | 6/2012 | Radja et al. .................. 708/251 |
| 8,254,570 B2 | 8/2012 | Clifford |
| 8,254,579 B1 | 8/2012 | Morgan et al. |
| 8,325,867 B2 | 12/2012 | Obata |
| 8,359,520 B2 | 1/2013 | Pietraski et al. |
| 8,364,982 B2 | 1/2013 | Jollis et al. |
| 2003/0122697 A1 * | 7/2003 | Schooler ............. H04J 13/0044 341/173 |
| 2006/0129806 A1 * | 6/2006 | Walmsley ............ B41J 2/17546 713/161 |
| 2007/0244951 A1 * | 10/2007 | Gressel et al. ................ 708/252 |
| 2008/0130891 A1 * | 6/2008 | Sun et al. ..................... 380/268 |

* cited by examiner 1000 01
0100 02
0010 03
1001 04
1100 05
0110 06
1011 07
0101 08
1010 09
1101 10
1110 11
1111 12
0111 13
0011 14
0001 15

21

Preload '1 0 0 0'
Into the 4 bit register

41

21

1 000 01
0 100 02
0 010 03
1 001 04
1 100 05
0 110 06
1 011 07
0 101 08
1 010 09
1 101 10
1 110 11
1 111 12
0 111 13
0 011 14
0 001 15

Preload '1 0 0 0'
Into the 4 bit register

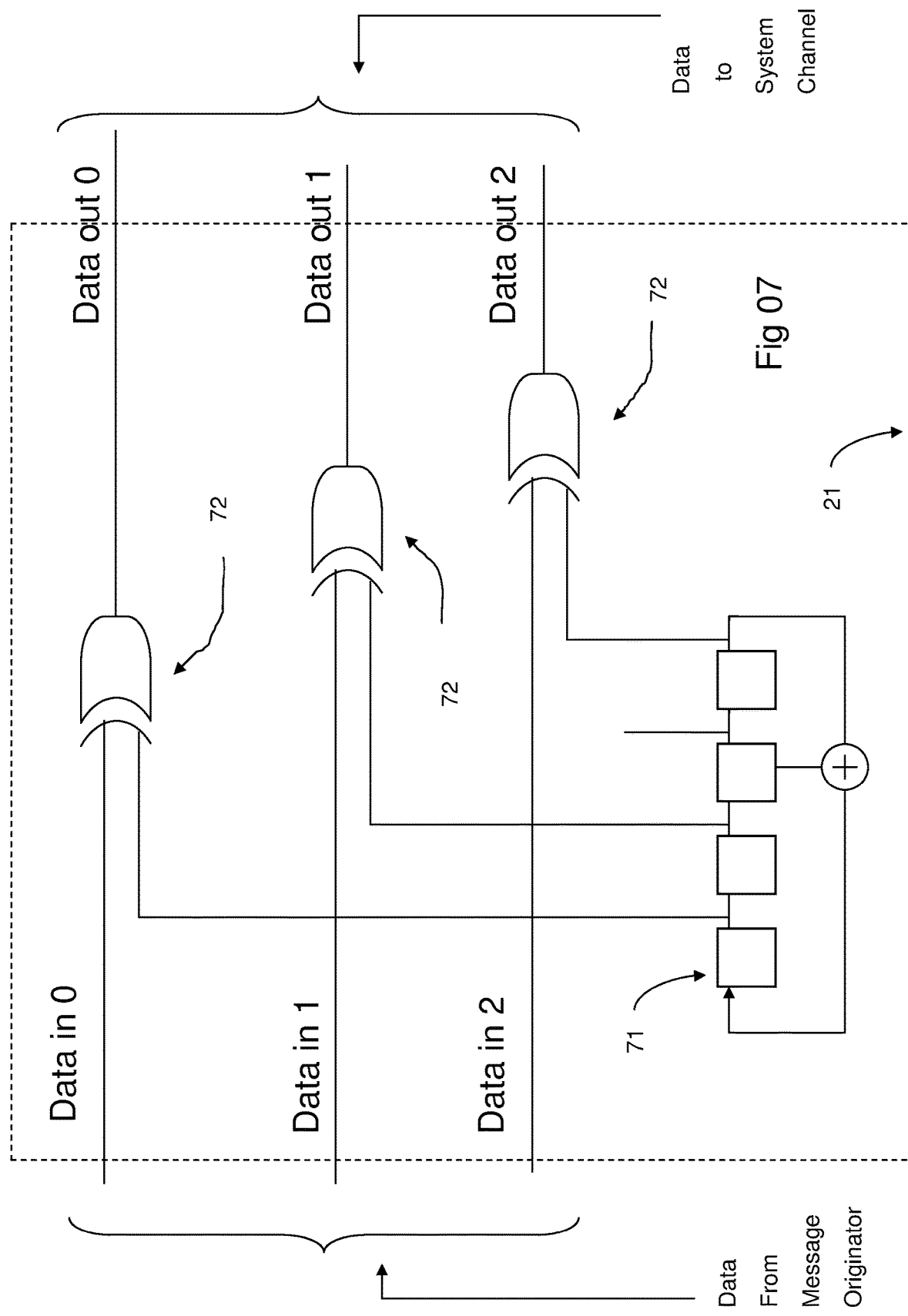

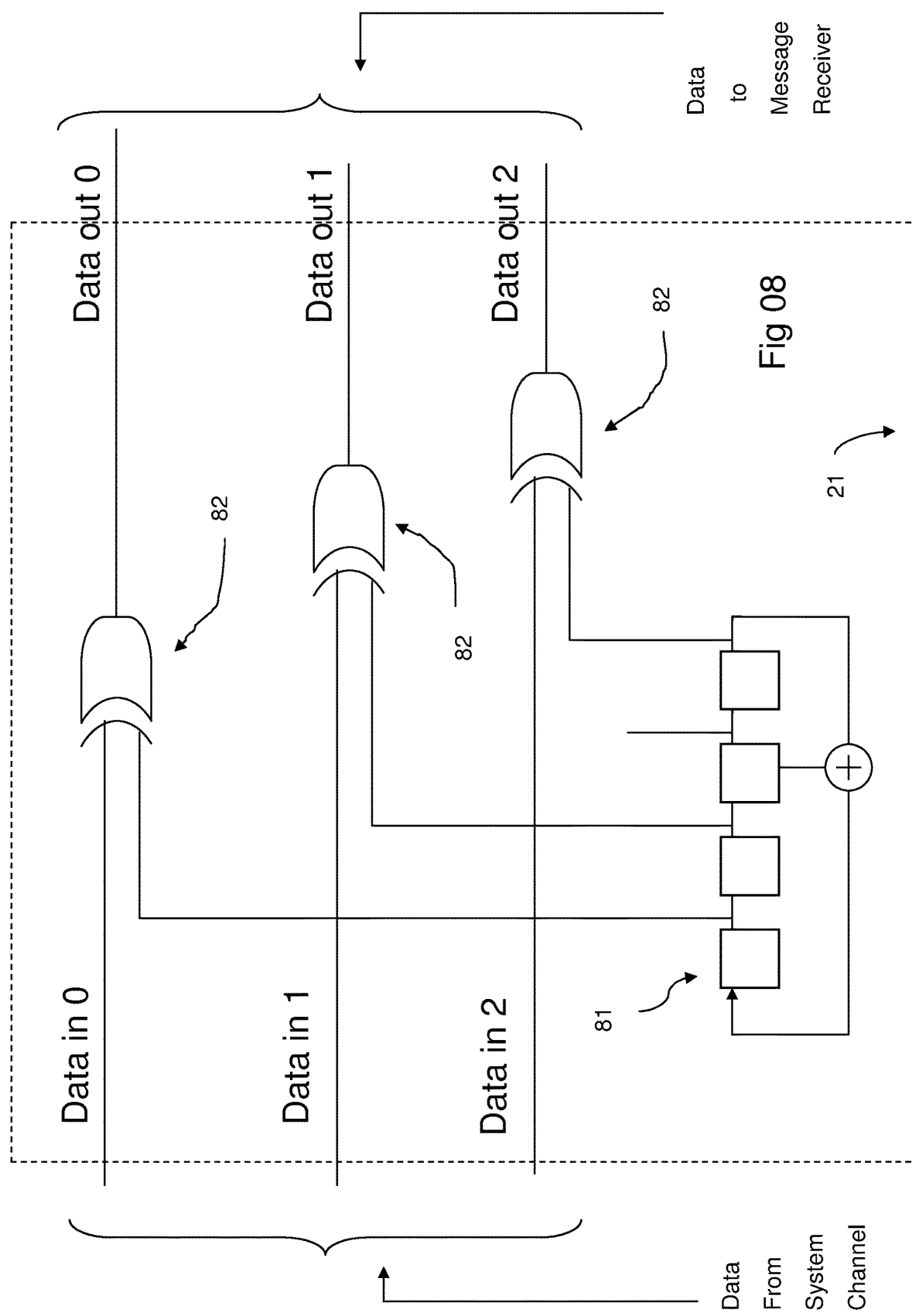

ONE PAD COMMUNICATIONS

FIELD OF THE INVENTION

This invention relates generally to cryptography, and more particularly to devices and methods for data encryption and decryption using software.

BACKGROUND OF THE INVENTION

Description of Prior Art

The Vernam cipher is the only known unbreakable method of encryption. It was developed by Gilbert Vernam in 1917 while employed by AT&T. It makes use of a one time pad that must be exchanged between the sender and the receiver via a secure channel (e.g. face to face). The pad must be generated in a totally random manner. Each pad must as long as the largest message. U.S. Pat. No. 7,133,525 to DeGregorio and Seeley, which is incorporated by reference herein, illustrates a Vernam cipher.

As for a random number generation circuit for generating pseudo random numbers, circuits using an LFSR are well known. However, U.S. Pat. No. 5,297,207 specifically states that LFSRs are too insecure to be used for random number generation.

One limitation of the LFSR has been the emphasis on the serial output as shown by U.S. Pat. No. 5,435,807. Even though the patent drawings show connections from the individual shift registers to outputs, there is no mention of their use. The same can be said of patents numbered U.S. Pat. Nos. 5,435,807, 5,974,433 and 6,353,842. U.S. Pat. No. 6,754,345 does not mention the outputs. U.S. Pat. No. 7,502,468 also relies on a serial stream for the output of the LFSR as does U.S. Pat. No. 8,209,367.

Other patents such as U.S. Pat. No. 7,120,696 show high level one pad system without showing a connection between the cryptography and how to achieve it.

Other references include "New LFSR Based Circuit for Generating Complex Code Sequences" by G. Mohiuddin and Faroze Ahmad "Electronics World"; ICSA "Guide to Cryptography" Randall K Nichols 1998 P 172; "On the Security and Composability of the One Time Pad"; Dominic Raub "Wireless Communications and Networking"; Vijay K. Garg p 321 "Digital Communications Test and Measurement"; Dennis Derickson Marcus Muller p820-823; Wikipedia.com Linear_feedback_shift_register article; and Xilinx App Note 052 "Efficient Shift Registers, LFSR Counters and Long Psuedo Random Sequence Generators" Jul. 7, 1996.

DESCRIPTION OF THE DRAWINGS AND TABLES

FIG. 01 shows a transmitting system with 11 being a message originator, an encoding device 12, a system channel 13, a decoding device 14 and a message receiver 15.

Figure 5:
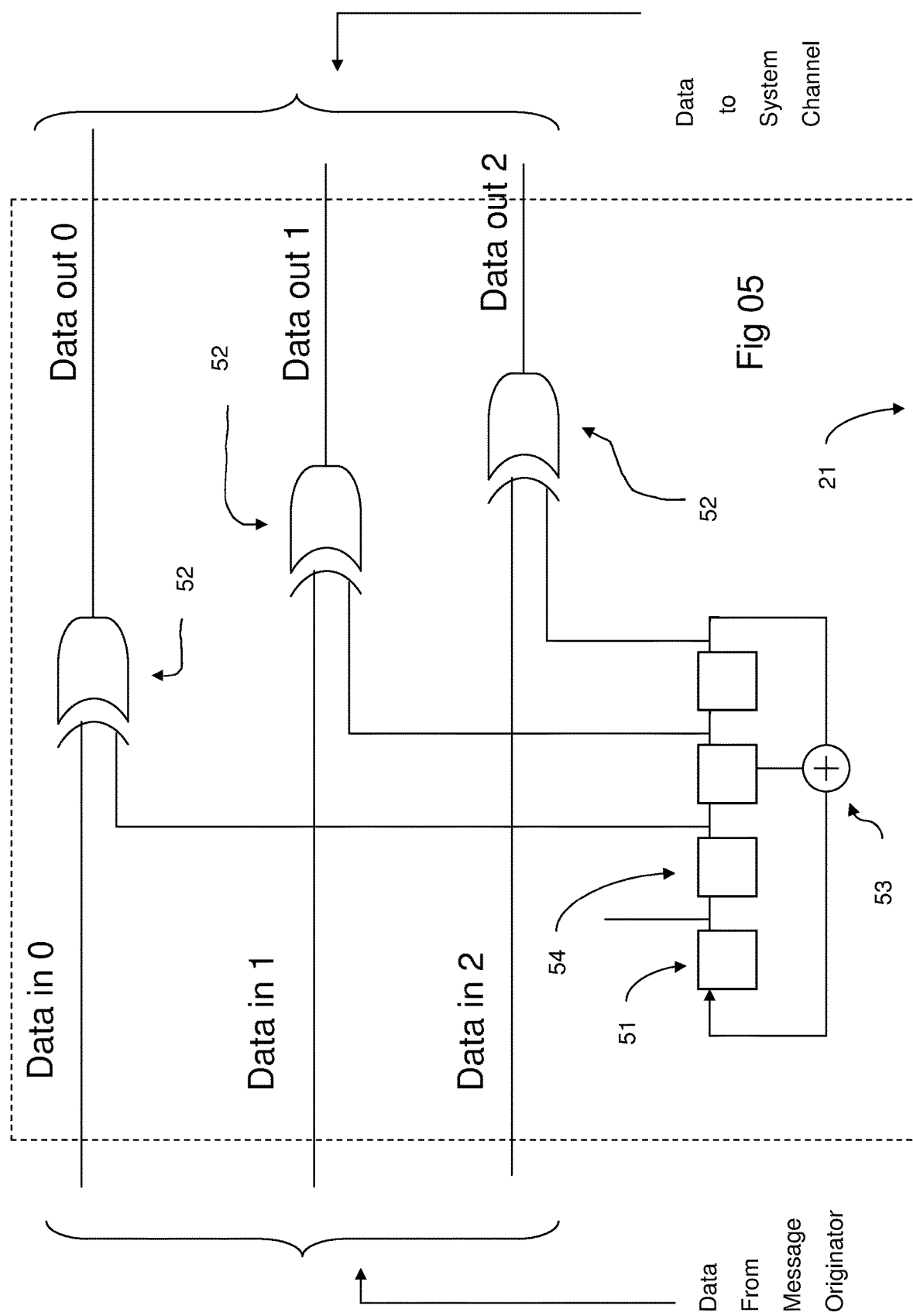

FIG. 05 shows a CPU 21 with 1 LFSR being comprised of 4 storage elements storing the value of the LFSR in elements 51 and 52. The other data comes from the message originator 11. The data is output to the system channel 13.

Figure 6:
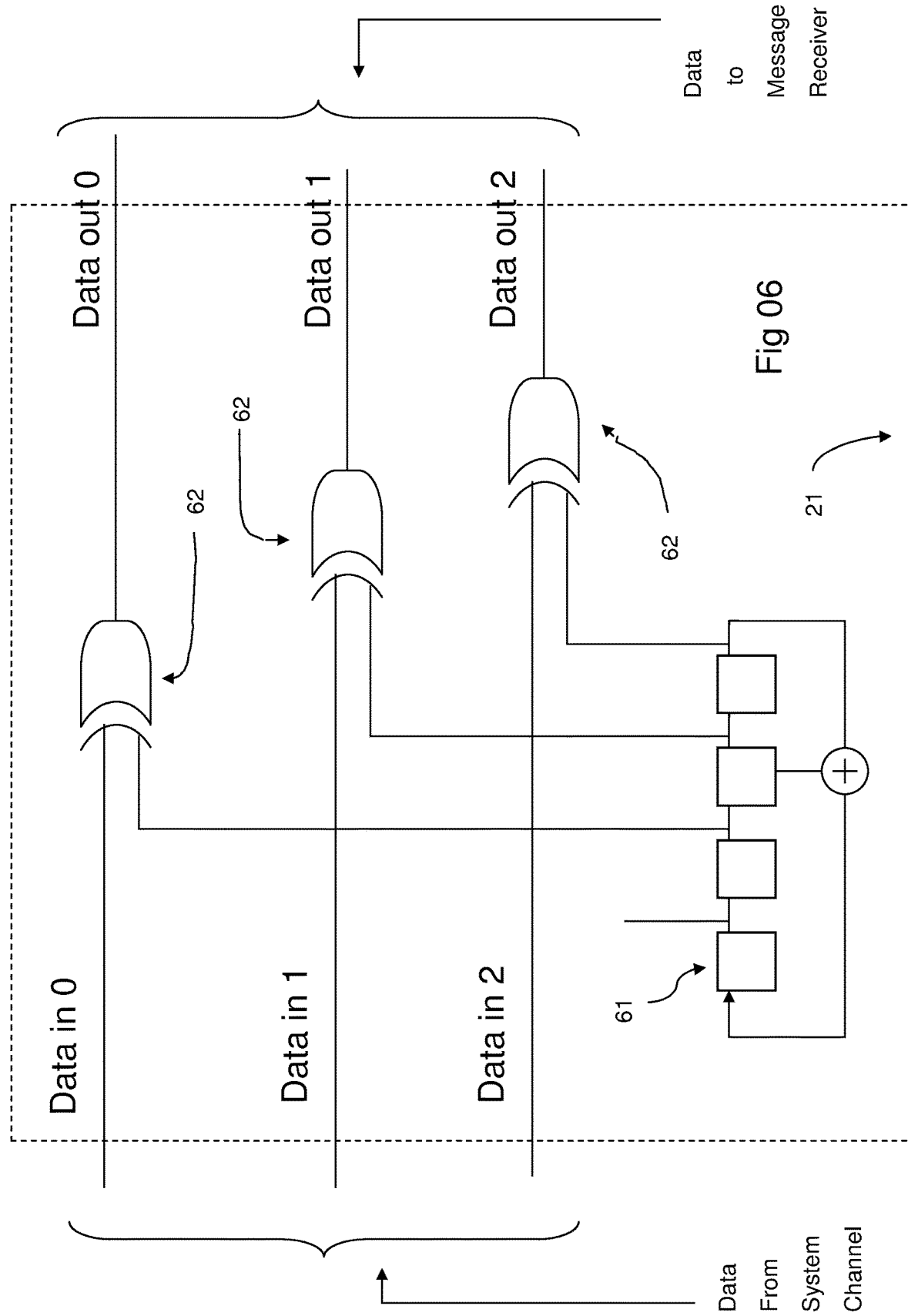

FIG. 06 shows a CPU 21 with 1 LFSR being comprised of 4 storage elements storing the value of the LFSR in elements 61 and 62. The other data comes from the system channel 13. The data is output to the message receiver 15.

FIG. 07 shows a CPU 21 with 1 LFSR being comprised of 4 storage elements storing the value of the LFSR in elements 71 and 72. The other data comes from the message originator 11. The data is output to the system channel 13.

FIG. 08 shows a CPU 21 with 1 LFSR being comprised of 4 storage elements storing the value of the LFSR in elements 81 and 82. The other data comes from the system channel 13. The data is output to the message receiver 15.

Table 01A-01C is a list of M-sequence linear feedback shift registers (LFSR).

Table 02 is data from the message originator 11 to the system channel 13.

Table 03 is data from the system channel 13 to the message Receiver 15.

Table 04 is data from the message originator 11 to the system channel 13.

Table 05 is data from the system channel 13 to the message Receiver 15.

Table 06 is data from the message originator 11 to the system channel 13.

Table 07 is data from the system channel 13 to the message Receiver 15.

Table 08 is data from the message originator 11 to the system channel 13.

Table 09 is data from the system channel 13 to the message Receiver 15.

DETAILED DESCRIPTION

It is noted that the Galois and the Fibonacci implementations are inverses of each other and are therefore covered by this patent. It is also noted that XOR and XNOR are inverses of each other and are covered by this patent.
Construction of the LFSR
Random Numbers
Software The difference between this patent and a similar hardware patent is the manner in which the operations are executed. In a software patent, the storage elements are memory locations, just like a hardware based patent but the exclusive OR elements are instructions within the program, or software.

The exclusive OR property is such that:
0 ^ 0=0 0
0 ^ 1=0 1
1 ^ 0=0 1
1 ^=1 0 but the carry 1 is discarded (modulo 2 system so 1 ^=0, effectively.

What this means is that a microcomputer type of device can implement an LFSR via the internal (on-chip) memory, external memory and the XOR/XNOR instructions. Then the operation of the LFSR proceeds in a manner similar to that of a hardware LFSR. The input registers are named data-in (i,x) and the output registers are named data-out (i,x)

An LFSR is implemented in software by reading a value in from external memory 24 which will place it in a temporary location called data-in [ ]. The value in data-in [ ] is XORed with a value of the LFSR, which also resides in a separate location within the internal memory of the microcomputer. The results of the XORing is placed into a location called data-out [ ], which is ready to output the value to an external memory location 22 or to an external output device 23.

```
/*    C code         */
size = 4;
/*         preload = 1000;        */
LFSR[1] = 1;
LFSR[2] = 0';
LFSR[3] = 0;
LFSR[4] = 0;
i = j = size;
j = 1;
for ( i=1; i < 16; i++)
{
    data-in[1,2] = ext-memory[j];
    data-in[i,1] = ext-memory[j+1];
    data-in[i,0] = ext-memory[j+2];
    j = j + 3;
    temp = LFSR[3] ^ LFSR4];
    data-out[i,2] = LFSR[4] ^ data-in[1,2];
    data-out[i,1] = LFSR[3] ^ data-in[i,1];
    data-out[i,0] = LFSR[2] ^ data-in[i,0];
    LFSR[4] = LFSR[3];
    LFSR[3] = LFSR[2];
    LFSR[2] = LFSR[1];
    LFSR[1] = temp;
    /*   Data shifts within the data-in memory
         Here the data-in memory is data from the
         message originator.         */
}
/*    C code
      Code to transfer data from the channel to the
      system receiver                  */
size = 4;
/*         preload = 1000;        */
LFSR[1] = 1;
LFSR[2] = 0';
LFSR[3] = 0;
LFSR[4] = 0;
i = size;
j = 1;
for ( i=1; i < 16; i++)
}
    ext-memory[j] = data-in[i,2];
    ext-memory[j+1] = data-in[1,1];
    ext=memory[j+2} = data-in[i,0];
    j = j + 3;
    temp = LFSR[3] ^ LFSR[4];
    data-out[i,2] = LFSR[4] ^ data-in[i,2];
    data-out[i,1] = LFSR[3] ^ data-in[i,1];
    data-out[i,0] = LFSR[2] ^ data-in[i,0];
    LFSR[4] = LFSR[3];
    LFSR[3] = LFSR[2];
    LFSR[2] = LFSR[1];
    LFSR[1] = temp;
    /*   Data shifts within the data-in memory
         Here the data is from the system channel    */
}
```

An LFSR consists of shift registers and a feedback network consisting only of modulo-2 adders (XOR or XNOR gates). The output of the feedback network is applied to the input, usually to the LSB.

The LFSR has a number of shift registers in it and it should be noted that the LFSR of the preferred embodiment is composed of two types of shift registers: encoding shift registers and free running shift registers. The two types of shift registers operate in sequence as they comprise parts of the same M-sequence LFSR. These are identical shift registers but they serve different purposes.

The free running shift registers are used as counters within the M-sequence LFSR during a value provided by a preload number provided to the LFSR. They provide a method to allow counting while the other shift registers provide encoding and decoding.

An M-sequence LFSR can be divided into two types of shift registers: N—Free wheeling counters and K—encoding/decoding counters. The K type of shift registers provide the random numbers while the N type provide the count.

N+K must equal M. If M=8 and N=2, then K=6, the number of random numbers will be $[(2^N-1)*2^K]+(2^K-1)$ or using the numbers given as $[(2^2-1)*2^6]+(2^6-1)$.

Then, subsequent to determining the number of shift registers needed, a number of exclusive OR gates are then selected as per Table 01A-01C. Now that the M-sequence LFSR is determined, the total count period is $(2^M-1)$ where M is composed of both the encoding shift registers and the free running shift registers. It should also be noted that the shift registers outputs may be arranged in any order.

The initial value of the LFSR is called the seed, and because the operation of the register is deter-ministic, the stream of values produced by the register is completely determined by its current (or previous) state. Likewise, because the register has a finite number of possible states, it must eventually enter a repeating cycle. However, an LFSR with a well-chosen feedback function can produce a sequence of bits which appears random and which has a very long cycle.

The position offset refers to the number of counts that are in the message before the encoding of the message begins. The length of the message is a count that tells the bank of shift registers how many counts the length of message to be encoded is.

Figure 1:
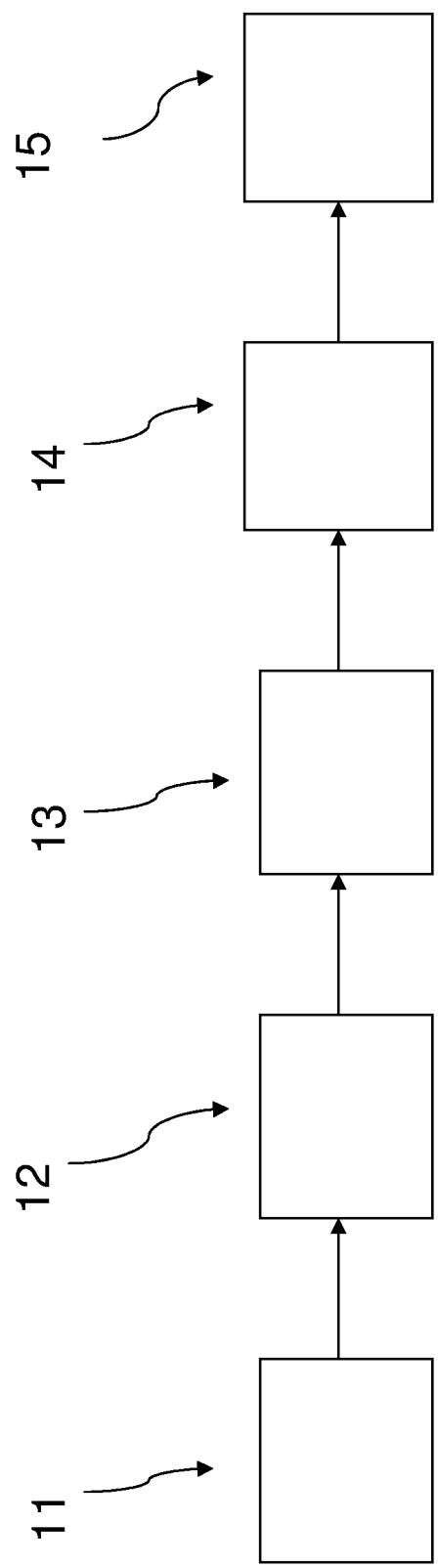
Figure 2:
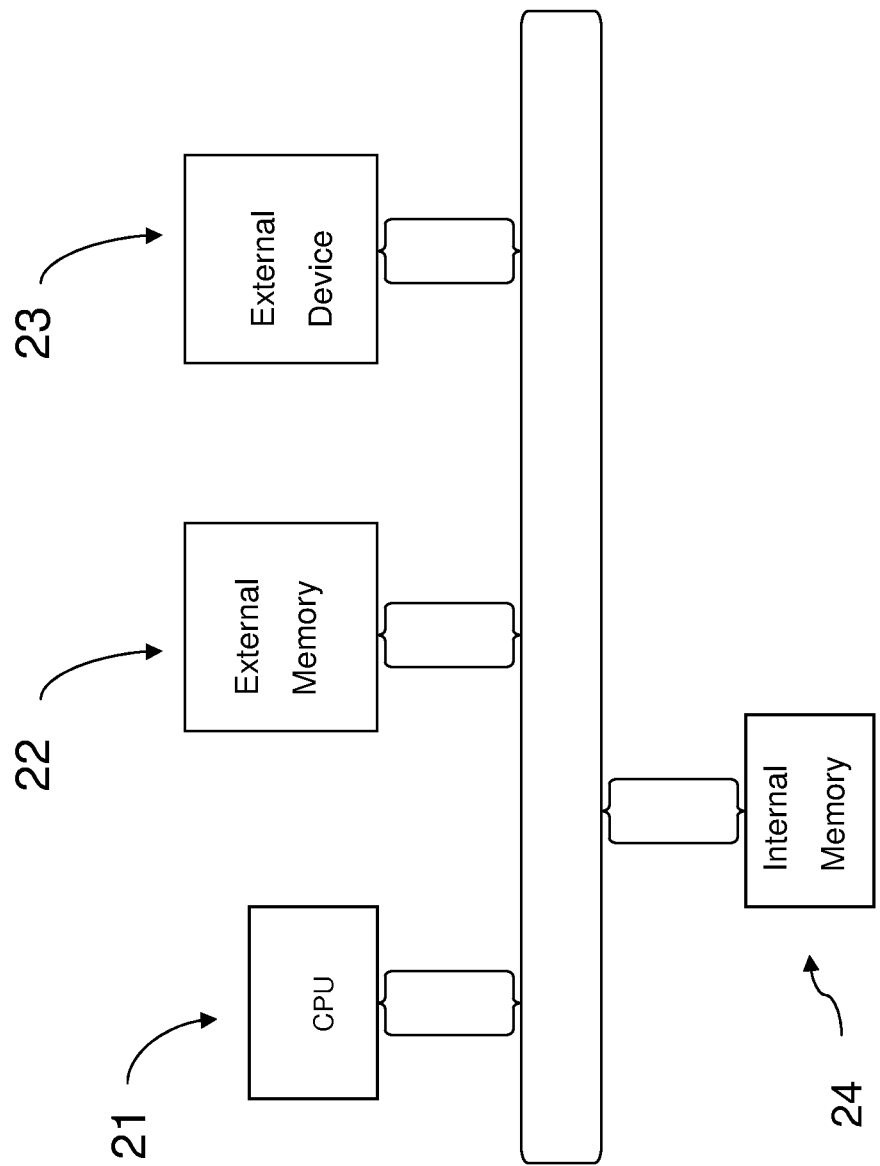
FIG. 02 is a block diagram of the present invention.

FIG. 02 shows a block diagram of the preferred embodiment.

Figure 3:
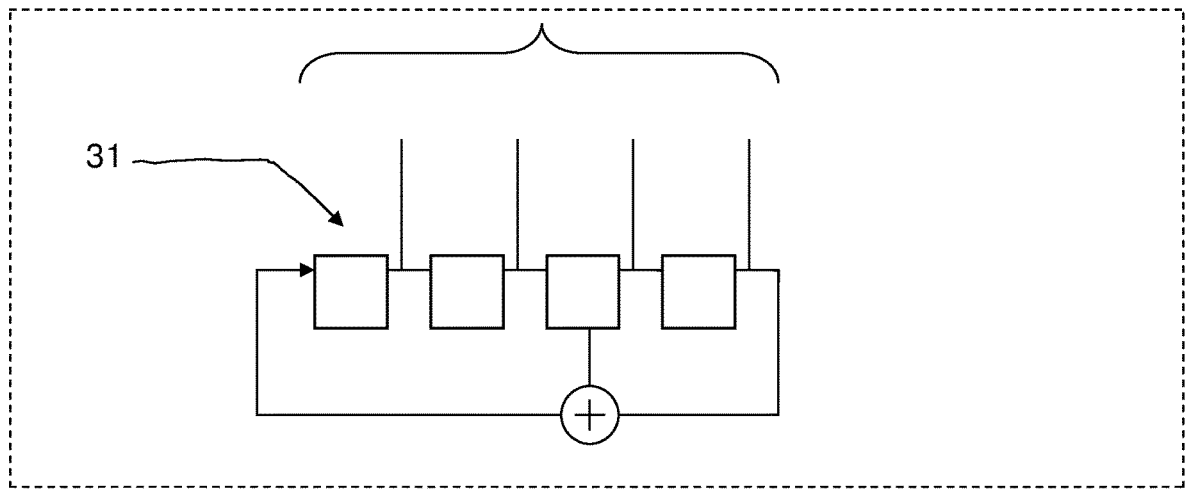
FIG. 03 shows an example of a 4 bit LFSR with a preload of '1 0 0 0' where the '1' is inserted into the LSB 31 of the LFSR.

Now referring to FIG. 03, 21 points to the CPU (Central processing unit) which contains 31, the least significant bit, (LSB) and the 3 other bits of the 4 bit shift register.

Figure 4:
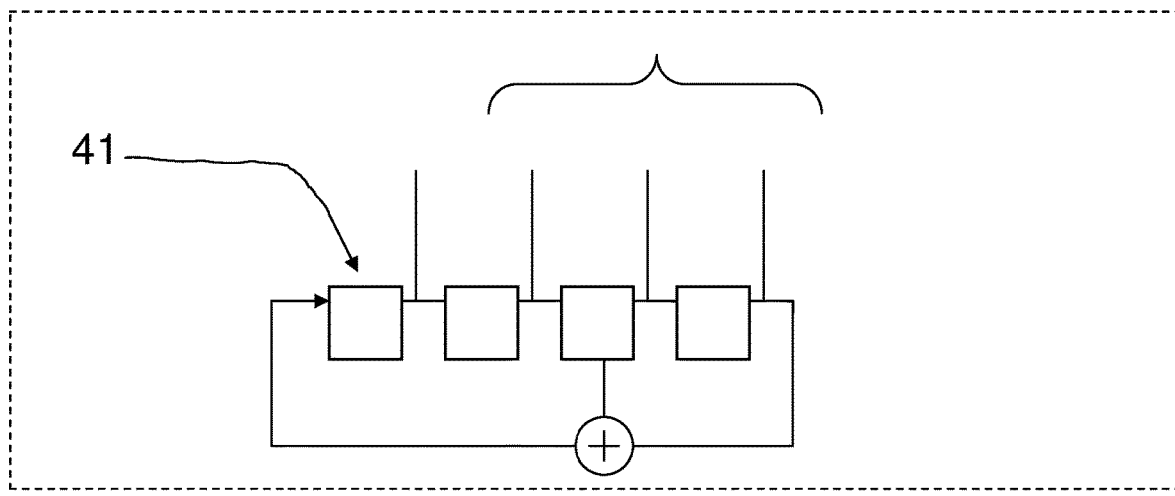
FIG. 04 is the same as FIG. 03 but with the LSB 41 separated from the remainder of the LFSR.

Referring to FIG. 04, 21 points to the CPU which contains 41, the least significant bit, (LSB) and the 3 other bits of the 4 bit shift register. This is where the LSB is separated from the remainder of the 4 bit shift register. In this case, 41 would point to the free running shift register bit of the 4 bit LFSR. The only difference between FIG. 03 and FIG. 04 is how the outputs of the shift registers are viewed. It is still the same data but it has a slightly different meaning.

In FIG. 05 as in FIGS. 03 and 04, 21 represents the CPU. Also, in FIGS. 06, 07 and 08, 21 represents the CPU.

Now referring to FIG. 05, the data-in[i,x] is fetched from external memory. The following instructions emulate the hardware as follows:
the Exclusive OR gates 52 are equivalent to the following instruction: A=B ^ C
or: Data-out[i,2]=LFSR[4] ^ Data-in{i,2};
Then the LSB 51 will be set to the value of
LFSR[3] Exclusive ORed with LFSR[4]:
temp=LFSR[3] ^ LFSR[4];
And finally the shifting action occurs by assignment:
LFST[4]=LFSR[3];
LFSR[3]=LFSR[2];
LFSR[2]=LFSR[1];
LFSR[1]=temp;
or it can be seen in bits 51 and 52.
The Exclusive OR is item 53.
The data-out [i,x] may either go to internal memory 22 Or they may be assigned to external memory 23 or an external device directly.

The following sections will be related as follows: Table 02 will be used with FIG. 05, Table 03 will be used with FIG. 06, Table 04 will be used with FIG. 05 and Table 05 will be used with FIG. 06. Furthermore, Table 06 will be used with FIG. 07 and Table 07 will be used with FIG. 08. Table 08 will be used with FIG. 05 and Table 09 will be used with FIG. 06.

Now referring to the encryption device 12, it is comprised of a plurality of shift registers and exclusive OR gates configured as per Table 01A through Table 01C. Each shift register has preload capability and a connection such that parallel outputs can be obtained from said shift register. Each shift register output is also connected to the input of the next shift register to provide a serial configuration, with the exception of the LSB. The LSB is driven by an output of the exclusive OR gate(s) as represented by the instructions in the C code, in a feedback configuration.

The data provided to the LFSR in FIG. 05 is supplied by the message originator 11 and it is in parallel form. The LSB of the M-sequence shift registers within FIG. 05 is 51. Referring to FIG. 05, the data supplied by the message originator 11 is exclusive ORed with the value from the LFSR. The data supplied by said message originator 11 is from Table 02 and contains the data set counting up from 0 to 7 two times used in a total of 15 counts. The number 15 comes from a 4 bit counter length of the M-sequence used in FIG. 05. The output to the system channel 13 is shown in Table 03.

The enciphered data is converted from a parallel format into a serial format and is then sent off to the system channel 13, or the data may be sent to a digital to analog converter and then sent to the system channel 13. The data can then be transmitted in a baseband format or upconverted to a carrier frequency.

With the one-pad configuration parameters received, refer to the deciphering unit 14. The first step is to ensure that the deciphering unit 14 is properly set up. This means that the LFSR has the proper M-sequence loaded. Then the taps have to be properly set. The offset count and the length must be set so that the encryption device 12 and the decryption device 14 are synchronized.

Referring to FIG. 06, the least significant bit of the LFSR is 61. The data into one input of the exclusive OR gates 62 as represented by the instructions in the C code comes from the system channel 13. The data to the other input of the exclusive OR gates 62 comes from the LFSR. The data is restored to its original format by exclusive ORing it with the value from the LFSR which is synchronized with the encryption device 12. The data at the message receiver 15 is the restored values that were sent by the message originator 11.

Another advantage of the present embodiment is the ability to generate different values for successive values of the same value in a data stream. To this end, Table 08 shows the data input of the same kind i.e. 100 100 100 100 001 001 001 001 010 010 101 101 111 111 111 and Table 09 shows the "Data Out" as having the same values as went into the exclusive OR gates 52 as represented by the instructions of the C code.

Examples

Referring to Table 02, it is used in conjunction with FIG. 05. Here the data from the message originator 11 into the exclusive OR gates 52 is labeled "Data In" and the LFSR supplies a random number to the other side of the exclusive OR gates 52. The column labeled "Data Out" is the result of the exclusive OR gates 52 and is sent to the system channel 13.

Now referring to Table 03, the "Data In" is supplied to one side of the exclusive OR gates 62 and the other input to the exclusive OR gates 62 is supplied by the LFSR which is synchronized with the transmit system of FIG. 05. The output of the exclusive OR gates 62 is now sent to the message receiver 15. As can be seen by Table 02 and Table 03, the data sent from message originator 11 is identical to that received by the message receiver 15. In this example, the data consisted of a series counting up from 0 to 7.

Now referring to Table 04, it operates in an identical manner as the previous example except that the order of the data is reversed, i.e. from 7 down to 0. Again, it can be seen that the "Data In" column of Table 04 is identical to the "Data Out" column of Table 05.

Now referring to FIG. 07, here the same concept is used as in FIG. 04 except the free running shift register used in the most significant bit-1 (MSB-1) or in this case, the third shift register in the LFSR 71.

As seen in Table 06, the third most bit of the 4 bit LFSR is the free running (counting) bit, with bits 1, 2 and 4 as the encoding/decoding bits. Table 06 shows the original 4 bit configuration in the first column, the second column shows the separation of bit 3 from the rest of the bits. And the third column shows the final arrangement of the free running bit from the encoding bits.

The process is repeated in Table 07 for the data coming from the system channel 13 to provide data for the deciphering device 14. The output to the system receiver 15 is shown to be the same as the data coming from the message originator 11. It is easy to see that no matter how the data coming from the LFSR is arranged, when deciphered, it returns to its original form.

FIG. 08 is a mirror of the parameters used to set up the LFSR in FIG. 07. It can be seen that the "Data Out" of Table 07 matches the "Data In" column of Table 06.

Another interesting feature of the present embodiment is the ability to generate different enciphered data for successive data having identical characteristics. Referring to Table 08, the data in the column "Data In" from the message originator 11 is 4 occurrences of the value "1 0 0" followed by 4 occurrences of the value "0 0 1". Furthermore, the data in the second grouping, the data is 2 occurrences of "0 1 0", followed by two occurrences of "1 0 1" and three occurrences of "1 1 1". Again, this data is supplied to one side of the exclusive OR gates 52 while the LFSR supplies data to the other side of the exclusive OR gates 52. The data is then sent to the system channel 13. It can be seen that the "Data Out" column of Table 09 matches the "Data In" column of Table 08.

In another example, if an ASCII code for the letter 'A' were to be transmitted, a 9 shift register can be used as follows: 1 bit of free running shift register and 8 bits of encoding shift registers. If a 43 count message of ASCII characters is to be transmitted, then a 14 bit M-sequence LFSR can be used as follows:

8 bits of encoding shift registers
6 bits of free running registers where 8 bits are used for the ASCII coding and 6 bits for the free running register.

One more aspect of the preferred embodiment is the ability to use more than the required number of bits to transmit a message. In a previous section of the the "Detailed Description", a mention was made of a system using a 14 bit wide M-sequence LFSR to transmit a message. For example, an 8 bit ASCII character may be coded using 8 bits. However, using an analogy from Direct Sequence Spread Spectrum (DSSS) systems, more than 8 bits can be used to code the signal. For example, coding of 14 bits may be used. The extra 6 bits will provide more robustness to interference or to being detected by an adversary. The same 43 count message would still require 6 bits of free running shift registers and an encoding value of 14 bits of shift registers. This will require a 20 bit shift registers.

Furthermore, the relative speeds of the encryption device and the decryption are immaterial as long as there is sufficient memory to store the messages.

All of the U.S. Patents cited herein are hereby incorporated by reference as if set forth in their entirety.

TABLE 02

| LFSR | Data In | Data Out |
|---|---|---|
| 1 000 | 000 | 000 |
| 0 100 | 001 | 101 |
| 0 010 | 010 | 000 |
| 1 001 | 011 | 010 |
| 1 100 | 100 | 000 |
| 0 110 | 101 | 011 |
| 1 011 | 110 | 101 |
| 0 101 | 111 | 010 |
| 1 010 | 000 | 010 |
| 1 101 | 001 | 100 |
| 1 110 | 010 | 100 |
| 1 111 | 011 | 100 |
| 0 111 | 100 | 011 |
| 0 011 | 101 | 110 |
| 0 001 | 110 | 111 |

TABLE 03

| LFSR | Data In | Data Out |
|---|---|---|
| 1 000 | 000 | 000 |
| 0 100 | 101 | 001 |
| 0 010 | 000 | 010 |
| 1 001 | 010 | 011 |
| 1 100 | 000 | 100 |
| 0 110 | 011 | 101 |
| 1 011 | 101 | 110 |
| 0 101 | 010 | 111 |
| 1 010 | 010 | 000 |
| 1 101 | 100 | 001 |
| 1 110 | 100 | 010 |
| 1 111 | 100 | 011 |
| 0 111 | 011 | 100 |
| 0 011 | 110 | 101 |
| 0 001 | 111 | 110 |

TABLE 04

| LFSR | Data In | Data Out |
|---|---|---|
| 1 000 | 111 | 111 |
| 0 100 | 110 | 010 |
| 0 010 | 101 | 111 |
| 1 001 | 100 | 101 |
| 1 100 | 011 | 111 |
| 0 110 | 010 | 100 |
| 1 011 | 001 | 010 |
| 0 101 | 000 | 101 |
| 1 010 | 111 | 101 |
| 1 101 | 110 | 011 |
| 1 110 | 101 | 011 |
| 1 111 | 100 | 011 |
| 0 111 | 011 | 100 |
| 0 011 | 010 | 001 |
| 0 001 | 001 | 000 |

TABLE 05

| LFSR | Data In | Data Out |
|---|---|---|
| 1 000 | 111 | 111 |
| 0 100 | 010 | 110 |
| 0 010 | 111 | 101 |
| 1 001 | 101 | 100 |

TABLE 05-continued

| LFSR | Data In | Data Out |
|---|---|---|
| 1 100 | 111 | 011 |
| 0 110 | 100 | 019 |
| 1 011 | 010 | 001 |
| 0 101 | 101 | 000 |
| 1 010 | 101 | 111 |
| 1 101 | 011 | 110 |
| 1 110 | 011 | 101 |
| 1 111 | 011 | 100 |
| 0 111 | 100 | 011 |
| 0 011 | 001 | 010 |
| 0 001 | 000 | 001 |

TABLE 06

| LFSR | | Data In | Data Out |
|---|---|---|---|
| 1000 | 10 0 0 | 0 100 | 000 | 100 |
| 0100 | 01 0 0 | 0 010 | 001 | 011 |
| 0010 | 00 1 0 | 1 000 | 010 | 010 |
| 1001 | 10 0 1 | 0 101 | 011 | 110 |
| 1100 | 11 0 0 | 0 110 | 100 | 010 |
| 0110 | 01 1 0 | 1 010 | 101 | 111 |
| 1011 | 10 1 1 | 1 101 | 110 | 011 |
| 0101 | 01 0 1 | 0 011 | 111 | 100 |
| 1010 | 10 1 0 | 1 100 | 000 | 100 |
| 1101 | 11 0 1 | 0 111 | 001 | 110 |
| 1110 | 11 1 0 | 1 110 | 010 | 100 |
| 1111 | 11 1 1 | 1 111 | 011 | 100 |
| 0111 | 01 1 1 | 1 011 | 100 | 111 |
| 0011 | 00 1 1 | 1 001 | 101 | 100 |
| 0001 | 00 0 1 | 0 001 | 110 | 111 |

TABLE 07

| LFSR | | Data In | Data Out |
|---|---|---|---|
| 1000 | 10 0 0 | 0 100 | 100 | 000 |
| 0100 | 01 0 0 | 0 010 | 011 | 001 |
| 0010 | 00 1 0 | 1 000 | 010 | 010 |
| 1001 | 10 0 1 | 0 101 | 110 | 011 |
| 1100 | 11 0 0 | 0 110 | 010 | 100 |
| 0110 | 01 1 0 | 1 010 | 111 | 101 |
| 1011 | 10 1 1 | 1 101 | 011 | 110 |
| 0101 | 01 0 1 | 0 011 | 100 | 111 |
| 1010 | 10 1 0 | 1 100 | 100 | 000 |
| 1101 | 11 0 1 | 0 111 | 110 | 001 |
| 1110 | 11 1 0 | 1 110 | 100 | 010 |
| 1111 | 11 1 1 | 1 111 | 100 | 011 |
| 0111 | 01 1 1 | 1 011 | 111 | 100 |
| 0011 | 00 1 1 | 1 001 | 100 | 101 |
| 0001 | 00 0 1 | 0 001 | 111 | 110 |

TABLE 08

| LFSR | Data In | Data Out |
|---|---|---|
| 1 000 | 100 | 100 |
| 0 100 | 100 | 000 |
| 0 010 | 100 | 110 |
| 1 001 | 100 | 101 |
| 1 100 | 001 | 101 |
| 0 110 | 001 | 111 |
| 1 011 | 001 | 010 |
| 0 101 | 001 | 100 |
| 1 010 | 010 | 000 |
| 1 101 | 010 | 111 |
| 1 110 | 101 | 011 |
| 1 111 | 101 | 010 |
| 0 111 | 111 | 000 |

TABLE 08-continued

| LFSR | Data In | Data Out |
| --- | --- | --- |
| 0 011 | 111 | 100 |
| 0 001 | 111 | 110 |

TABLE 09

| LFSR | Data In | Data Out |
| --- | --- | --- |
| 1 000 | 100 | 100 |
| 0 100 | 000 | 100 |
| 0 010 | 110 | 100 |
| 1 001 | 101 | 100 |
| 1 100 | 101 | 001 |
| 0 110 | 111 | 001 |
| 1 011 | 010 | 001 |
| 0 101 | 100 | 001 |
| 1 010 | 000 | 010 |
| 1 101 | 111 | 010 |
| 1 110 | 011 | 101 |
| 1 111 | 010 | 101 |
| 0 111 | 000 | 111 |
| 0 011 | 100 | 111 |
| 0 001 | 110 | 111 |

TABLE 02 - A

| n | XNOR form |
| --- | --- |
| 3 | 3, 2 |
| 4 | 4, 3 |
| 5 | 5, 3 |
| 6 | 6, 5 |
| 7 | 7, 6 |
| 8 | 8, 6, 5, 4 |
| 9 | 9, 5 |
| 10 | 10, 7 |
| 11 | 11, 9 |
| 12 | 12, 6, 4, 1 |
| 13 | 13, 4, 3, 1 |
| 14 | 14, 5, 3, 1 |
| 15 | 15, 14 |
| 16 | 16.15, 13, 4 |
| 17 | 17, 14 |
| 18 | 18, 11 |
| 19 | 19, 6, 2, 1 |
| 20 | 20, 17 |
| 21 | 21, 19 |
| 22 | 22, 21 |
| 23 | 23, 18 |
| 24 | 24, 23, 22, 17 |
| 25 | 25, 22 |
| 26 | 26, 6, 2, 1 |
| 27 | 27, 5, 2, 1 |
| 28 | 28, 25 |
| 29 | 29, 27 |
| 30 | 30, 6, 4, 1 |
| 31 | 31, 28 |
| 32 | 32, 22, 2, 1 |
| 33 | 33, 20 |
| 34 | 34, 27, 2, 1 |
| 35 | 35, 33 |
| 36 | 36, 25 |
| 37 | 37, 5, 4, 3, 2, 1 |
| 38 | 38, 6, 5, 1 |
| 39 | 39.35 |
| 40 | 40, 38, 21, 19 |
| 41 | 41, 38 |
| 42 | 42, 41, 20.19 |
| 43 | 43, 42, 38, 37 |
| 44 | 44, 43, 18, 17 |
| 45 | 45, 44, 42, 41 |
| 46 | 46, 45, 26, 25 |
| 47 | 47, 42 |
| 48 | 48, 47, 21, 20 |

TABLE 02 - A-continued

| n | XNOR form |
| --- | --- |
| 49 | 49, 40 |
| 50 | 50, 49, 24, 23 |
| 51 | 51, 50, 36, 35 |
| 52 | 52, 49 |
| 53 | 53, 52, 38, 37 |
| 54 | 54, 53, 18, 17 |
| 55 | 55, 31 |
| 56 | 56, 55, 35, 34 |
| 57 | 57, 50 |
| 58 | 58, 39 |
| 59 | 59, 58, 38, 37 |
| 60 | 60, 59 |
| 61 | 61, 60, 46, 45 |
| 62 | 62, 61, 6, 5 |
| 63 | 63, 62 |
| 64 | 64, 63, 61, 60 |
| 65 | 65, 47 |
| 66 | 66, 65, 57, 56 |
| 67 | 67, 66, 57, 56 |
| 68 | 68, 59 |

TABLE 02 - B

| n | XNOR form |
| --- | --- |
| 69 | 69, 67, 42, 40 |
| 70 | 70, 69, 55, 54 |
| 71 | 71, 65 |
| 72 | 72, 66, 25, 19 |
| 73 | 73, 48 |
| 74 | 74, 73, 59, 58 |
| 75 | 75, 74, 65, 64 |
| 76 | 76, 75, 41, 40 |
| 77 | 77, 76, 47, 46 |
| 78 | 78, 77, 59, 58 |
| 79 | 79, 70 |
| 80 | 80, 79, 43, 42 |
| 81 | 81, 77 |
| 82 | 82, 79, 47, 44 |
| 83 | 83, 82, 38, 37 |
| 84 | 84, 71 |
| 85 | 85, 84, 58, 57 |
| 86 | 86, 85, 74, 73 |
| 87 | 87, 74 |
| 88 | 88, 87, 17, 16 |
| 89 | 89, 51 |
| 90 | 90, 89, 72, 71 |
| 91 | 91, 90, 8, 7 |
| 92 | 92, 91, 80, 79 |
| 93 | 93, 91 |
| 94 | 94, 73 |
| 95 | 95, 84 |
| 96 | 96, 94, 49, 47 |
| 97 | 97, 91 |
| 98 | 98, 87 |
| 99 | 99, 97, 54, 52 |
| 100 | 100, 63 |
| 101 | 101, 100, 95, 94 |
| 102 | 102, 101, 36, 35 |
| 103 | 103, 94 |
| 104 | 104, 103, 94, 93 |
| 105 | 105, 89 |
| 106 | 106, 91 |
| 107 | 107, 105, 44, 42 |
| 108 | 108, 77 |
| 109 | 109, 108, 103, 102 |
| 110 | 110, 109, 98, 97 |
| 111 | 111, 101 |
| 112 | 112, 110, 69, 67 |
| 113 | 113, 104 |
| 114 | 114, 113, 33, 32 |
| 115 | 115, 114, 101, 100 |
| 116 | 116, 115, 46, 45 |
| 117 | 117, 115, 99, 97 |
| 118 | 118, 85 |

TABLE 02 - B-continued

| n | XNOR form |
|---|---|
| 119 | 119, 111 |
| 120 | 120, 113, 9, 2 |
| 121 | 121, 103 |
| 122 | 122, 121, 63, 62 |
| 123 | 123, 121 |
| 124 | 124, 87 |
| 125 | 125, 124, 18, 17 |
| 126 | 126, 125, 90, 89 |
| 127 | 127, 126 |
| 128 | 128, 126, 101, 99 |
| 129 | 129, 124 |
| 130 | 130, 127 |
| 131 | 131, 130, 84, 83 |
| 132 | 132, 103 |
| 133 | 133, 132, 82, 81 |
| 134 | 134, 77 |

TABLE 02C

| n | XNOR form |
|---|---|
| 135 | 135, 124 |
| 136 | 136, 135, 11, 10 |
| 137 | 137, 116 |
| 138 | 138, 137, 131, 130 |
| 139 | 139, 136, 134, 131 |
| 140 | 140, 111 |
| 141 | 141, 140, 110, 109 |
| 142 | 142, 121 |
| 143 | 143, 142, 123, 122 |
| 144 | 144, 143, 75, 74 |
| 145 | 145, 93 |
| 146 | 146, 145, 87, 86 |
| 147 | 147, 146, 110, 109 |
| 148 | 148, 121 |
| 149 | 149, 148, 40, 39 |
| 150 | 150, 97 |
| 151 | 151, 148 |
| 152 | 152, 151, 87, 86 |
| 153 | 153, 152 |
| 154 | 154, 152, 27, 25 |
| 155 | 155, 154, 124, 123 |
| 156 | 156, 155, 41, 40 |
| 157 | 157, 156, 131, 130 |
| 158 | 158, 157, 132, 131 |
| 159 | 159, 128 |
| 160 | 160, 159.142, 141 |
| 161 | 161, 143 |
| 162 | 162.161, 75, 74 |
| 163 | 163, 162, 104, 103 |
| 164 | 164, 163, 151, 150 |
| 165 | 165, 164, 135, 134 |
| 166 | 166, 165, 128, 127 |
| 167 | 167, 161 |
| 168 | 168, 166, 153, 151 |

What is claimed is:

1. An encryption/decryption apparatus comprising:
an n-bit linear feedback shift register (LFSR) comprised of p "encryption" bits $P_1 \ldots P_p$ and m "free run" bits where n=m+p;
a p-bit data input register comprising bits $I_1 \ldots I_p$;
a p-bit data output register comprising bits $O_1 \ldots O_p$;
p logic gates $G_1 \ldots G_p$ where, for each x in 1 ... p, a first input of $G_x$ is an output of $I_x$, a second input of $G_x$ is $P_x$, and an input of $O_x$ is an output of $G_x$
where the location of the free run bits within the LFSR is selectable at initialization;
where, at initialization, the LFSR is configured to permit the loading of an n-bit seed value;
where, in run mode, for each p bits of input data, the LFSR simultaneously:
parallel loads the results of the outputs of the logic gates into the data output register;
loads the result of a feedback gate, the inputs of which comprise the most significant output bit and at least one other output bit of the LFSR into the input of the least significant bit of the LFSR, said output bits selectable so as to make the cycle length of the LFSR $2^n-1$;
shifting each bit of the LFSR to the next most significant bit position of the LFSR;
where the p logic gates function is either XOR or XNOR; and
where the feedback gate function is either XOR or XNOR.

2. The encryption/decryption apparatus of claim 1 wherein at least one free run bit is situated between two encryption bits.

3. The encryption/decryption apparatus of claim 1 wherein the p logic gates function is XOR.

4. The encryption/decryption apparatus of claim 1 wherein the p logic gates function is selectable at initialization.

5. The encryption/decryption apparatus of claim 1 further comprising a counter configurable to be loaded with a count wherein the LFSR is stepped count times after initialization and before step mode.

6. A method of secure communication comprising:
configuring first and second encryption/decryption apparatuses according to claim 5 with the same selections of n, m, p, p logic gates function, feedback gate function, count, and locations of free run bits;
providing data to be encrypted to the input register of the first apparatus and receiving encrypted data from the output register of the first apparatus;
providing the encrypted data to the input register of the second apparatus and receiving decrypted data from the output register of the second apparatus.

7. A non-transitory computer readable medium containing a computer program for encrypting and decrypting data, said program configured to, when executed by a CPU:
implement an n-bit linear feedback shift register (LFSR) comprised of p "encryption" bits and m "free run" bits where n=m+p and the location of the free run bits within the LFSR is selectable at initialization;
implement a p-bit data input register;
implement a p-bit data output register;
wherein, at initialization, the LFSR permits the loading of an n-bit seed value;
wherein, in step mode, an LFSR step comprises simultaneously:
parallel loading the result of parallel BINOP1ing the outputs of the p encryption bits with the p bits of the data input register into the data output register;
loading the result of a feedback function comprising BINOP2ing the most significant output bit and at least one other output bit of the LFSR into the input of the least significant bit of the LFSR, said output bits selectable so as to make the cycle length of the LFSR $2^n-1$;
shifting each bit of the LFSR to the next most significant bit position of the LFSR;
wherein the program is configured to step the LFSR one step for each p bits of input data;
where BINOP1ing is either XORing or XNORING; and
where BINOP2ing is either XORing or XNORING.

8. The non-transitory computer readable medium of claim 7 wherein at least one free run bit is situated between two encryption bits.

9. The non-transitory computer readable medium of claim 7 further comprising a counter configurable to be loaded with a count wherein the LFSR is stepped count times after initialization and before step mode.

* * * * *